(12) United States Patent
Recker et al.

(10) Patent No.: US 11,618,518 B2
(45) Date of Patent: Apr. 4, 2023

(54) GROUND-ENGAGING TRACK FOR MACHINE HAVING MULTI-TOOTH MASTER LINK

(71) Applicant: Caterpillar Inc., Peoria, IL (US)

(72) Inventors: Roger Lee Recker, Dunlap, IL (US); Donovan Stuart Clarke, East Peoria, IL (US); Eric Bernard Weisbruch, Edwards, IL (US); Kevin Lee Steiner, Tremont, IL (US); Jianjun Wang, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 373 days.

(21) Appl. No.: 16/905,681

(22) Filed: Jun. 18, 2020

(65) Prior Publication Data

US 2021/0394840 A1 Dec. 23, 2021

(51) Int. Cl.
*B62D 55/21* (2006.01)
(52) U.S. Cl.
CPC .......... *B62D 55/213* (2013.01); *B62D 55/21* (2013.01)
(58) Field of Classification Search
CPC ..... B62D 55/205; B62D 55/21; B62D 55/213
See application file for complete search history.

(56) References Cited

U.S. PATENT DOCUMENTS

| | | | | |
|---|---|---|---|---|
| 3,427,079 A | * | 2/1969 | Maytum | B62D 55/213 305/202 |
| 3,822,923 A | | 7/1974 | Stedman | |
| 4,105,260 A | * | 8/1978 | Blunier | B62D 55/213 305/188 |
| 4,351,573 A | * | 9/1982 | Bedis | B62D 55/213 305/188 |
| 4,361,364 A | | 11/1982 | Brunn | |
| 4,455,054 A | | 6/1984 | Brunn | |
| 4,579,394 A | * | 4/1986 | Bedis | B62D 55/213 305/202 |
| 4,636,014 A | * | 1/1987 | Dennison | B62D 55/213 305/202 |
| 5,700,384 A | | 12/1997 | Marchand et al. | |
| 10,676,143 B2 | * | 6/2020 | Johannsen | B62D 55/20 |
| 2008/0174175 A1 | | 7/2008 | Livesay et al. | |
| 2019/0092404 A1 | | 3/2019 | Johannsen et al. | |

FOREIGN PATENT DOCUMENTS

| CN | 203637969 U | 6/2014 |
|---|---|---|
| GB | 1193647 A | 6/1970 |

* cited by examiner

*Primary Examiner* — Ajay Vasudeva
(74) *Attorney, Agent, or Firm* — Brannon Sowers & Cracraft

(57) ABSTRACT

A ground-engaging track includes a track chain formed of standard links and at least one master link. The master link include a first half link and a second half link, clamped together by way of a forward bolt and a rearward bolt. Clamping surfaces of the first half link and the second half link form a first tooth set and a second tooth set, respectively, which may include a total of 2 or 3 full teeth and tooth roots, confined in distribution between a forward bolt hole and a rearward bolt hole.

20 Claims, 6 Drawing Sheets

GROUND-ENGAGING TRACK FOR MACHINE HAVING MULTI-TOOTH MASTER LINK

TECHNICAL FIELD

The present disclosure relates generally to a ground-engaging track in a machine, and more particularly to a multi-tooth master link.

BACKGROUND

A variety of different types of machines have ground-engaging tracks consisting of a plurality of links coupled together to form a flexible, endless loop that extends around rotatable track-engaging elements. Mining, construction, forestry, roadbuilding and other industries all rely to a great extent upon machines having ground-engaging tracks. As with any machine system, it can be desirable to provide some means for facile disassembling of certain components for servicing or repair. A "master link" is provided in many ground-engaging tracks for this purpose, and a great many different designs have been developed over the years.

In one common class of master link designs multiple teeth are provided on separate master link portions that can be interlocked to mate the master link portions together. Fasteners such as bolts may be used to secure the respective link portions together, and the master link positioned in a machine track where it operates much like any of the other links. When it is desirable to break the track for repair, servicing, shipping, et cetera, the fasteners coupling the link portions together are removed, allowing the track to be separated via disassembling the link portions. More than one master link can be used in a given track chain, and assembled tracks consisting of parallel track chains will typically have at least two master links. While the basic two-part master link design has proven to be quite useful, the ruggedness of many environments within which track-type machines operate can place a premium on durability and service life, and some existing master links tend to prematurely fail.

The number, spacing, orientation, curvature, and other geometric features of teeth in master links can vary, and engineers have experimented with numerous different designs over the years. It has also been discovered that in certain instances, a single-tooth design provides a practical strategy. Single-tooth master links, however, can nevertheless have disadvantages and in some instances appear to permit rotation or rocking between the link portions ultimately leading to performance degradation or failure.

Multi-tooth master link designs can have their own advantages and disadvantages. While the multiple teeth can assist in achieving a robust interlock between the link portions, extensive machining time during manufacturing can be required to produce the separate link portions with numerous teeth. Moreover, the numerous radiused tooth surfaces upon each part can serve to concentrate stresses experienced in the field that can also ultimately lead to performance degradation or failure, especially in hard rock environments.

United States Patent Application Publication No. 2008/0174175 to Livesay et al. is directed to a master link for a track including profiled surfaces of first and second link members having the form of a sinusoidal segment defined by a tooth and an adjacent recess. While Livesay et al. may have advantages in application, for the reasons discussed above and still others there is always room for improvement and alternative strategies in this field.

SUMMARY OF THE DISCLOSURE

In one aspect, a master link for a ground-engaging track includes a first half link having a first link strap with a first transverse bore formed therein, and a first clamping surface forming a first tooth set, an ascending slope extending between the first tooth set and a shoe side of the first half link, and a descending slope extending between the first tooth set and a rail side of the first half link. The master link further includes a second half link having a second link strap with a second transverse bore formed therein, and a second clamping surface forming a second tooth set, an ascending slope extending between the second tooth set and a shoe side of the second half link, and a descending slope extending between the second tooth set and a rail side of the second half link. A forward bolt hole and a rearward bolt hole are each formed in part within each of the first half link and the second half link and intersect each of the first clamping surface and the second clamping surface, and are structured to receive a forward bolt and a rearward bolt, respectively, for clamping the first half link and the second half link together to interlock the first tooth set and the second tooth set. The first tooth set and the second tooth set each include a plurality of teeth alternating with a plurality of tooth roots including a forward tooth root adjacent to the respective ascending slope, and a rearward tooth root adjacent to the respective descending slope. The first tooth set and the second tooth set are confined in distribution between the forward bolt hole and the rearward bolt hole.

In another aspect, a ground-engaging track includes a track chain having a plurality of track links coupled end-to-end and including a plurality of standard links and master link. The master link includes a first half link, and a second half link. The first half link includes a first link strap, and a first clamping surface forming a first tooth set. The second half link includes a second link strap, and a second clamping surface forming a second tooth set. A forward bolt hole and a rearward bolt hole are each formed in part within each of the first half link and the second half link and intersect each of the first clamping surface and the second clamping surface, and are structured to receive a forward bolt and a rearward bolt, respectively, to clamp the first half link and the second half link together such that the first tooth set and the second tooth set are interlocked. The first tooth set and the second tooth set each include a plurality of teeth alternating with a plurality of tooth roots, and are confined in distribution between the forward bolt hole and the rearward bolt hole.

In still another aspect, a master link for a ground-engaging track includes a first half link having a first link strap with a first transverse bore formed therein, and a first clamping surface forming a first tooth set, an ascending slope extending between the first tooth set and a shoe side of the first half link, and a descending slope extending between the first tooth set and a rail side of the first half link. The master link further includes a second half link having a second link strap with a second transverse bore formed therein, and a second clamping surface forming a second tooth set, an ascending slope extending between the second tooth set and a shoe side of the second half link, and a descending slope extending between the second tooth set and a rail side of the second half link. A forward bolt hole and a rearward bolt hole are each formed in part within each of the first half link and the second half link to receive bolts for clamping the first half link and the second half link together. The first tooth set and the second tooth set each include a total of two full teeth and a total of three tooth roots. The forward bolt hole and the rearward bolt hole each intersect the first clamping surface and the second clamping surface and are located outside of the first tooth set and the second tooth set, such that bolt hole stress concentration locations are spaced fore and aft, respectively, of tooth root stress concentration locations in the master link.

DETAILED DESCRIPTION

Figure 1:
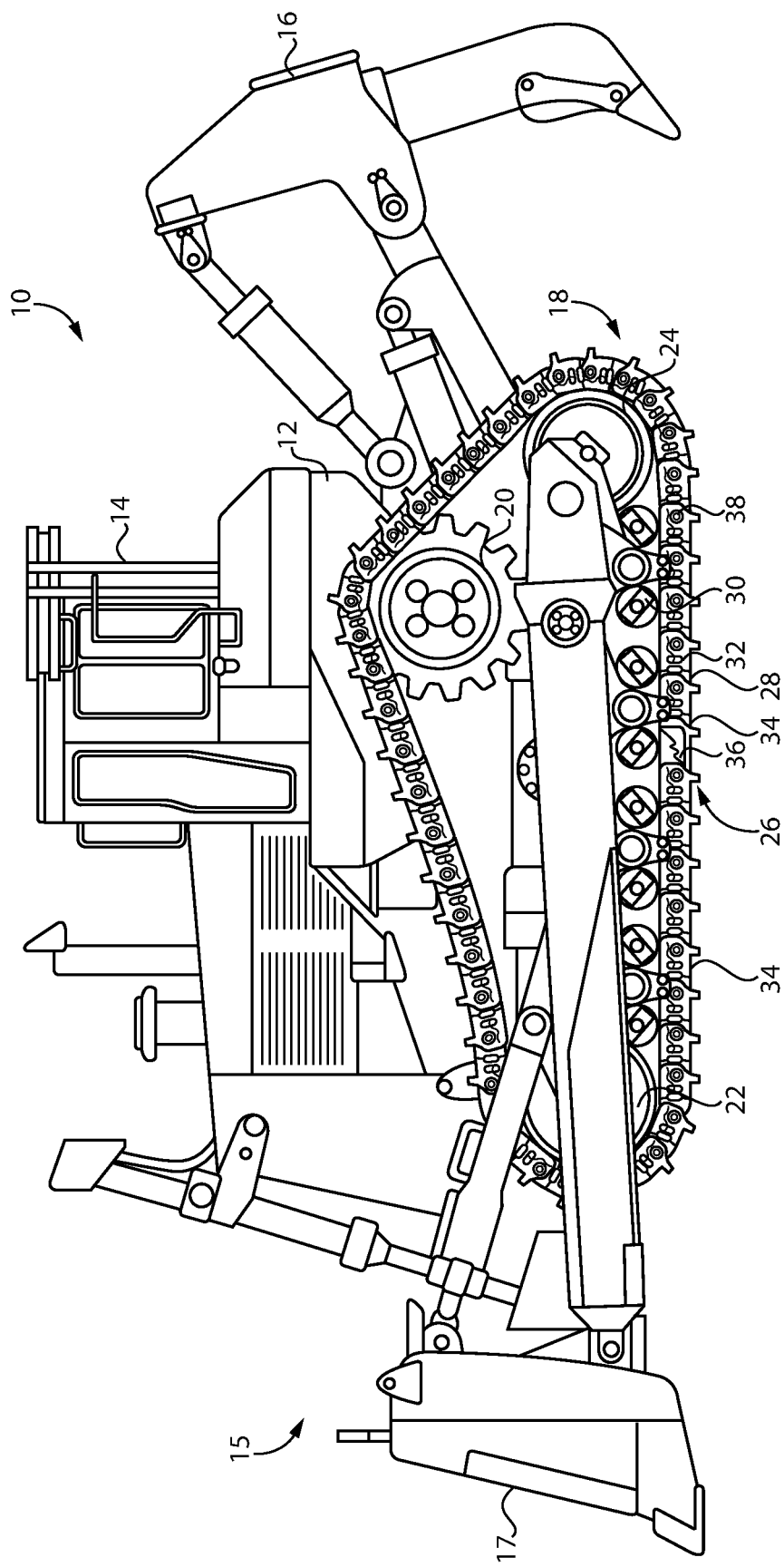
FIG. 1 is a side diagrammatic view of a machine having a ground-engaging track, according to one embodiment.

Referring to FIG. 1, there is shown a track-type machine 10 according to one embodiment. Track-type machine 10 includes a frame 12 having an operator cab 14 supported thereon. A hydraulically actuated implement system 15 of machine 10 includes a blade 17 supported at a front end of frame 12, and a ripper 16 supported at a back end of frame 12. Track-type machine 10 could include any of a variety of machines such as a track-type tractor, a track loader, a half-track machine, or still another. Track-type machine 10 includes a track system 18 having a ground-engaging track 26 mounted at a first side of frame 12, and a second substantially identical ground-engaging track mounted at an opposite side of frame 12 and not visible in FIG. 1. Track system 18 also includes a drive sprocket 20, a front idler 22, a back idler 24, and a plurality of track rollers 30. Ground-engaging track 26 extends around the various rotatable track-engaging elements in a generally conventional manner. Track system 18 is depicted as having a so-called high-drive configuration, with drive sprocket 20 elevated and operating in conjunction with two idlers 22 and 24. In other instances, track system 18 could have an oval track arrangement, or still another. A weight of track-type machine 10 is supported substantially by track rollers 30 which roll upon track rails along an inside surface of ground-engaging track 26. Ground-engaging track 26 will typically include two parallel track chains. Visible in FIG. 1 is one track chain 28 having a plurality of track links coupled end-to-end, and including a plurality of standard links 34 and at least one master link 36. As noted, track chain 28 may be one of two parallel track chains, and it will thus be understood that a second, substantially identical or mirror image track chain is hidden from view in FIG. 1 behind the plane of the page. Track shoes 32 are attached to each of standard links 34 and master link 36, and track pins 38 couple track chain 28 with its companion track chain not visible in FIG. 1.

In a practical implementation strategy, each of the track chains in a ground-engaging track according to the present disclosure includes at least one master link 36. One, two, three, or potentially even more master links could be provided in each track chain providing a plurality of locations at which track 26 can be broken for servicing or replacement, for example. It should also be appreciated that while a ground-engaging track is considered a practical application, in other instances a track having a master link according to the present disclosure could be applied in a conveyor or another application. As noted above track chain 28 can include a plurality of standard links 34 and master link 36. Standard links 34 could be straight links, offset links having laterally offset link straps, links formed integrally with track shoes, or any of a variety of other link types. As will be further apparent from the following description, master link 36 is contemplated to provide improved resistance to fracture or performance degradation over the course of a field service life.

Figure 2:
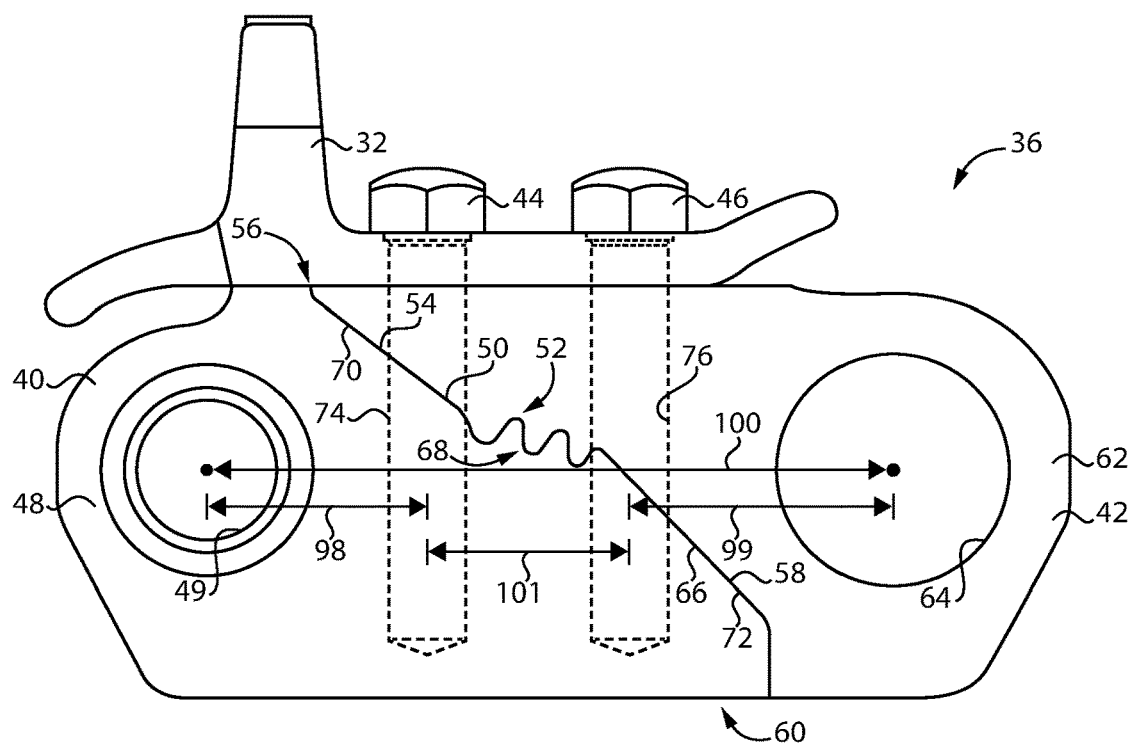
FIG. 2 is a side diagrammatic view of a master link, according to one embodiment.
Figure 3:
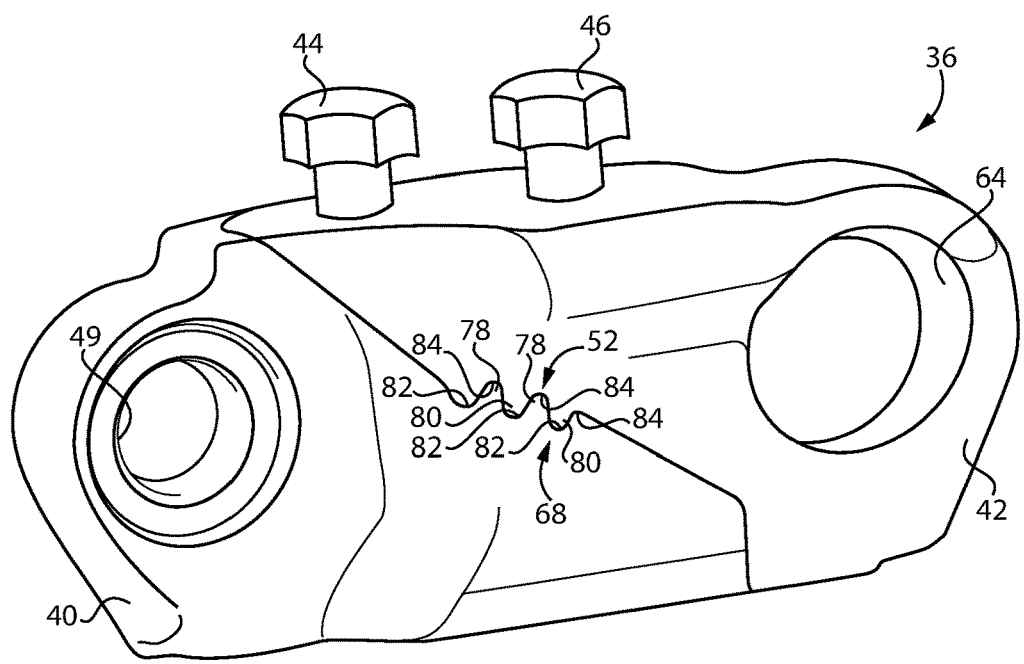
FIG. 3 is a diagrammatic view, in perspective, of a master link, according to one embodiment.
Figure 4:
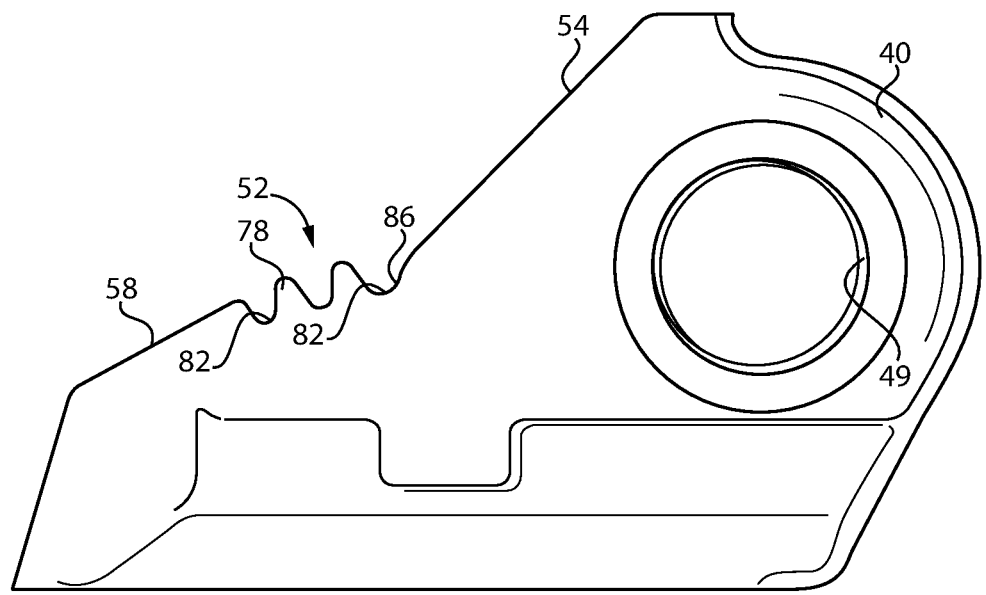
FIG. 4 is a side diagrammatic view of a first half link of a master link, according to one embodiment.

Referring also now to FIGS. 2 and 3, master link 36 includes a first half link 40 having a first link strap 48. A first transverse bore 49 is formed in first link strap 48. In the illustrated embodiment first transverse bore 49 includes a track pin bore structured to receive a track pin by way of an interference fit. Additionally or alternatively positive pin retention features such as snap rings, keepers, or the like, could be used to secure a track pin in first transverse bore 49. First half link 40 further includes a first clamping surface 50 forming a first tooth set 52, an ascending slope 54 extending between first tooth set 52 and a shoe side 56 of first half link 40, and a descending slope 58 extending between first tooth set 52 and a rail side 60 of first half link 40. Master link 36 further includes a second half link 42 having a second link strap 62. A second transverse bore 64 is formed in second link strap 62, and in the illustrated embodiment includes a bushing bore structured to receive a track pin bushing such as by way of an interference fit. Those skilled in the art will be familiar with track pin and bushing configurations and arrangements for connecting adjacent parallel track chains. A bushing bore in accordance with the present disclosure will typically differ from a track pin bore at least with respect to its size. Accordingly, as can be seen from FIGS. 2 and 3, second transverse bore 64 may be larger in diameter than first transverse bore 49. The present disclosure is not thereby limited, however, and an opposite arrangement, where bore 64 is smaller than bore 49, or an arrangement where bores 64 and 49 are equal in size, will still fall within the scope of the present disclosure.

Second half link 42 further includes a second clamping surface 66 forming a second tooth set 68, an ascending slope 70 extending between second tooth set 68 and a shoe side 56 of second half link 42, and a descending slope 72 extending between second tooth set 68 and a rail side 60 of second half link 42. Shoe side 56 of each of first half link 40 and second half link 42, and master link 36 itself, is the side structured to attach to a track shoe 32 as shown. Rail side 60 is an opposite side of each of first half link 40 and second half link 42, and master link 36, and is structured, together with adjacent track links in track chain 28, to form a track rail that is contacted by track rollers 30 during service. The terms "ascending," "descending," "forward," "rearward," and like directional indicators are used herein for descriptive convenience and should not be understood to limit the scope of description to any particular orientation or arrangement of the subject features described. Analogously, the terms "first, " "second," et cetera, are not to be taken to require any particular ordering, orientation, or other limitation to the present description and are likewise used here for convenience.

A forward bolt hole 74 and a rearward bolt hole 76 are each formed in part within each of first half link 40 and second half link 42 and receive a forward bolt 44 and a rearward bolt 46, respectively, for clamping first half link 40 and second half link 42 together such that first tooth set 52 and second tooth set 68 are interlocked. Forward bolt hole 74 and rearward bolt hole 76 may each open in shoe side 56 of second half link 42 and terminate within first half link 40. Within first half link 40 each of forward bolt hole 74 and rearward bolt hole 76 may be internally threaded. First tooth set 52 and second tooth set 68 each include a plurality of teeth 78 and 80, respectively, and a plurality of tooth roots 82 and 84, respectively, alternating with the respective teeth 78 and 80. First tooth set 52 and second tooth set 68 are confined in distribution between forward bolt hole 74 and rearward bolt hole 76. "Confined in distribution" means that an entirety of the teeth and tooth roots in each of first tooth set 52 and second tooth set 68 are arranged between the two bolt holes 74 and 76, the significance of which will be further apparent from the following description. The plurality of teeth 78 and 80 includes a total of two or three full teeth in each of first tooth set 52 and second tooth set 68. In a refinement, the plurality of teeth 78 and 80 includes a total of two full teeth in each of first tooth set 52 and second tooth set 68, and a total of three tooth roots. A full tooth as described herein includes a tooth that is complete fore and aft so as to include, in profile, a forward tooth face and a rearward tooth face, and complete and uninterrupted across a width of the respective half link. Thus, a tooth that is intersected by a bolt hole would be widthwise interrupted and fore and aft interrupted and thus not full, and a tooth that includes only one of, or only a partial, forward tooth face or rearward tooth face would also be not full. By locating forward bolt hole 74 and rearward bolt hole 76 outside of first tooth set 52 and second tooth set 68, bolt hole stress concentration locations can be spaced fore and aft, respectively, of tooth root stress concentration locations when master link 36 is assembled for service with first half link 40 and second half link 42 clamped together and first tooth set 52 and second tooth set 68 interlocked.

Also shown in FIG. 2 are a number of dimensional and proportional attributes of master link 36. Forward bolt hole 74 and rearward bolt hole 76 define a center-to-center bolt hole distance 101. First half link 40 and second half link 42 together define a link pitch distance 100, a center-to-center distance between first transverse bore 49 and second transverse bore 64. First transverse bore 49 and forward bolt hole 74 define a first bore-to-bolt distance 98. Second transverse bore 64 and rearward bolt hole 76 define a second bore-to-bolt distance 99. Relationships between and among the dimensional and proportional attributes identified in FIG. 2, and others discussed herein, as well as the significance to fitting a total of two or three full teeth having desired geometry will be further apparent from the following description.

Figure 5:
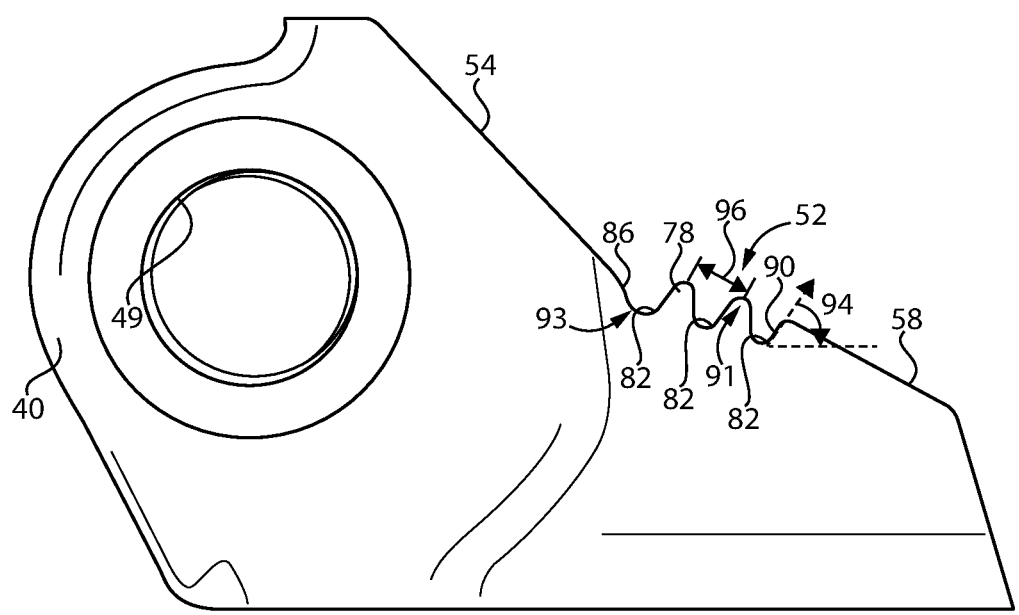
FIG. 5 is another side diagrammatic view of the first half link.
Figure 6:
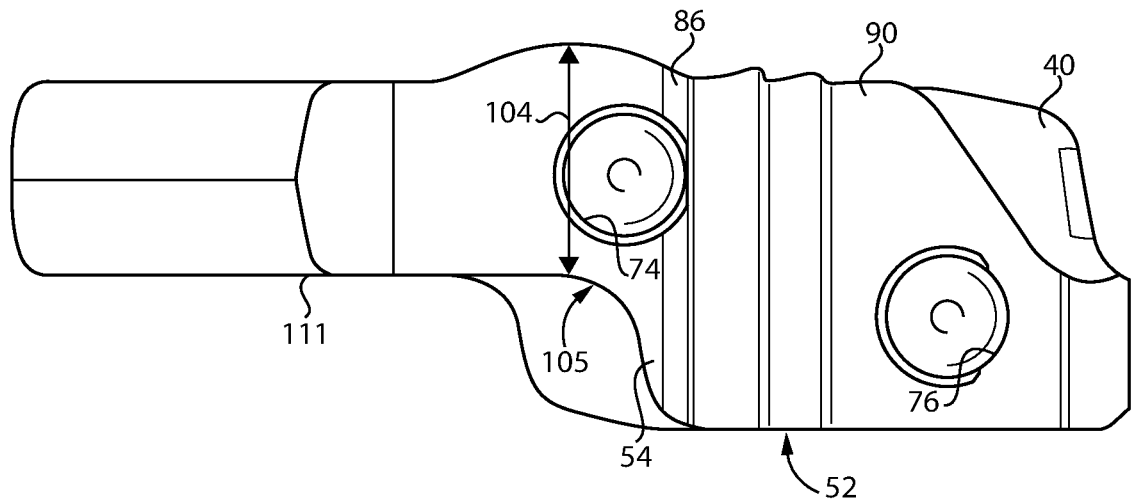
FIG. 6 is an elevational view of the first half link.
Figure 7:
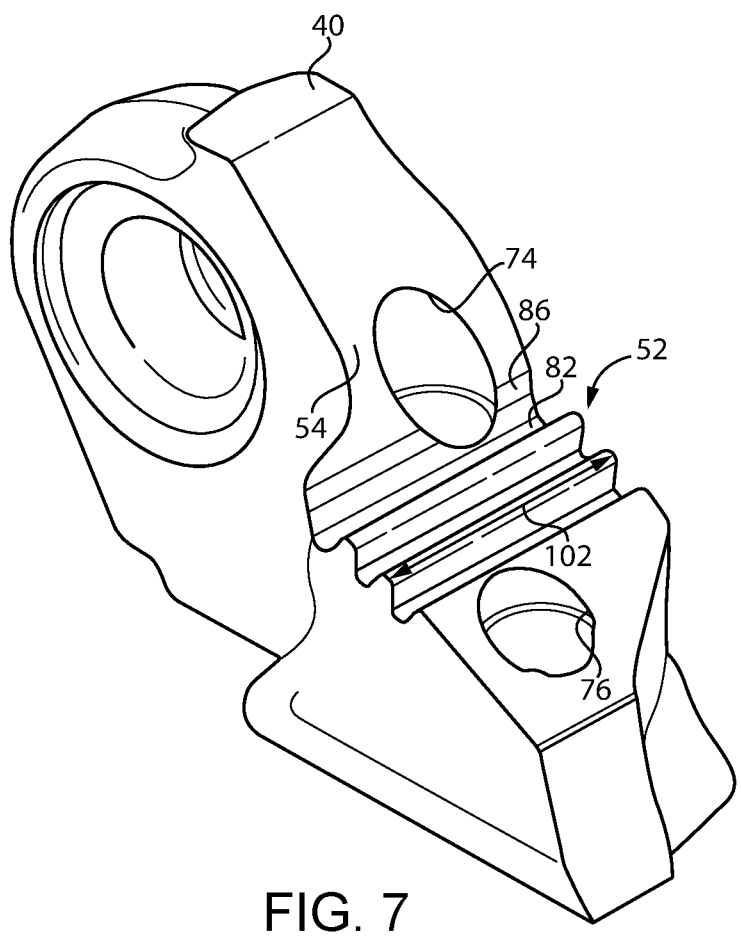
FIG. 7 is an isometric view of the first half link.
Figure 8:
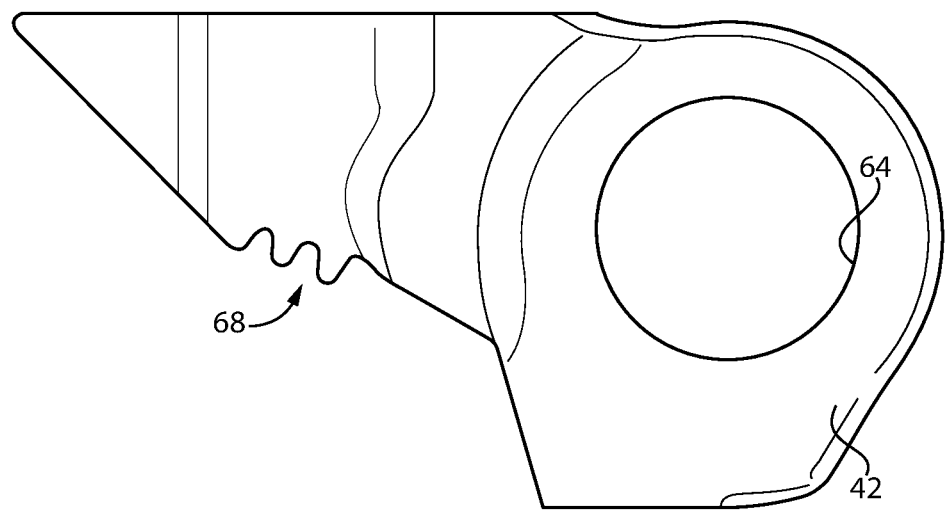
FIG. 8 is a side diagrammatic view of a second half link for a master link, according to one embodiment.
Figure 9:
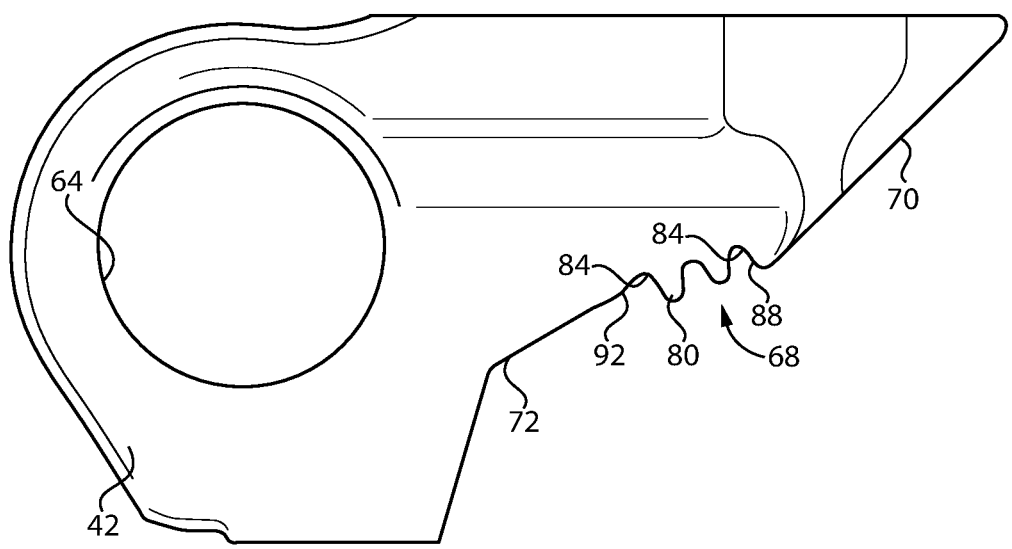
FIG. 9 is another side diagrammatic view of the second half link.
Figure 10:
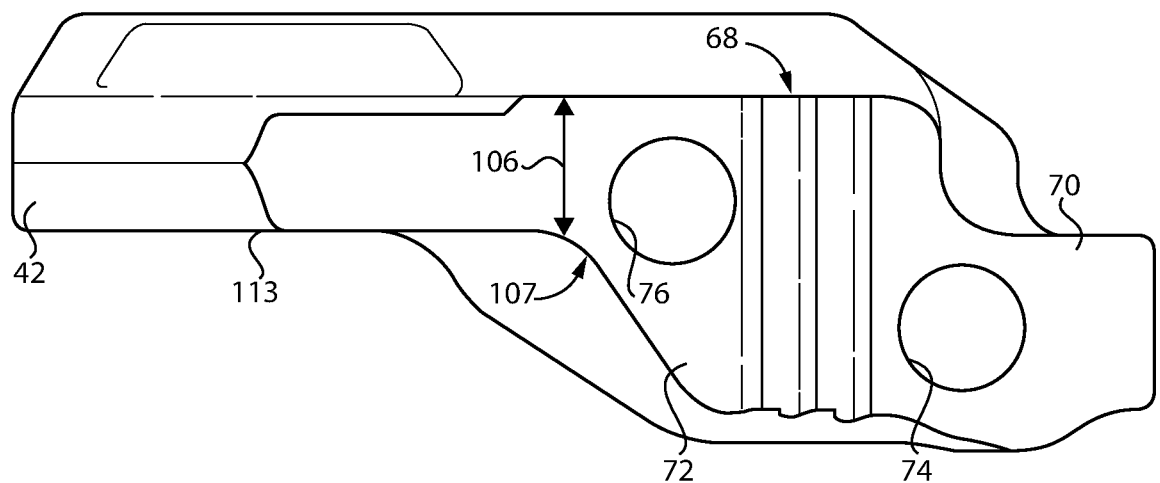
FIG. 10 is an elevational view of the second half link.
Figure 11:
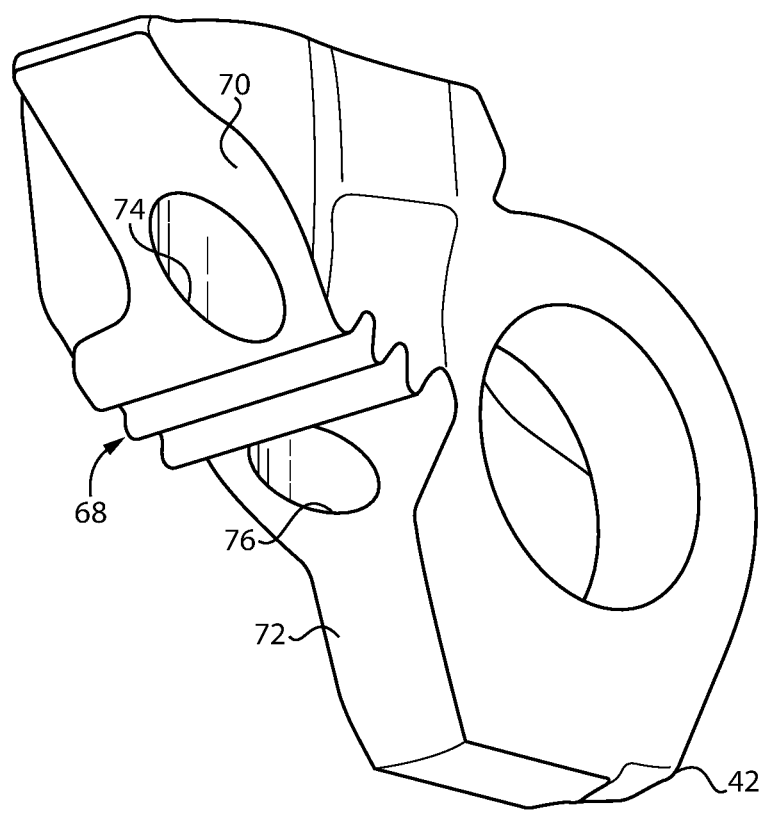
FIG. 11 is an isometric view of the second half link.

Referring also now to FIGS. 4-11, there are shown various views of first half link 40 and second half link 42. As depicted in FIG. 6, first half link 40 defines a forward face width 104. As depicted in FIG. 10, second half link 42 defines a rearward face width 106. First clamping surface 54 and second clamping surface 70 are typically complementary, and thus each of first half link 40 and second half link 42 can be understood to define forward face width 104 and rearward face width 106. In FIG. 7, it can be seen that first tooth set 52 defines a tooth width or full width 102. Complementary second tooth set 68 can be analogously understood to define full width 104. The relationships between and among face widths 104, 106, full width 102, and other features are further discussed below.

It will be recalled that each of first tooth set 52 and second tooth set 68 includes a plurality of teeth alternating with a plurality of tooth roots. As depicted in the drawings, the plurality of tooth roots 82 of first tooth set 52 and the plurality of tooth roots 84 of second tooth set 68 each include a forward tooth root 82 and 84, respectively. The forward tooth root in first half link 40 will be understood as the tooth root 82 closest to link strap 48, and the forward tooth root 84 of second tooth set 68 will be understood as the tooth root furthest from link strap 62. Each of first tooth set 52 and second tooth set 68 also includes a rearward tooth root 82 and 84, respectively, which in the case of half link 40 is the tooth root 82 furthest from link strap 48, and in the case of second half link 42 the tooth root 84 closest to link strap 62. Each of first tooth set 52 and second tooth set 68 also includes a forward transition surface extending from the respective forward tooth root 82 and 84. In the case of first tooth set 52 the forward transition surface is shown at 86 and extends from the forward tooth root 82 to ascending slope 54. In the case of second tooth set 68 the forward transition surface is shown at 88 and extends from the forward tooth root 84 to ascending slope 70. Each of first tooth set 52 and second tooth set 68 further includes a rearward transition surface extending from the respective rearward tooth root 82 and 84. In the case of first tooth set 52 the rearward transition surface is shown at 90 and extends from the rearward tooth root 82 to descending slope 58. In the case of second half link 42 the rearward transition surface is shown at 92 and extends from the rearward tooth root 84 to descending slope 72. In a practical implementation strategy, forward bolt hole 74 intersects one of forward transition surfaces 86 and 88 but not the other of forward transition surfaces 86 and 88. Rearward bolt hole 76 intersects one of rearward transition surfaces 90 and 92 but not the other of rearward transition surfaces 90 and 92. In the case of first half link 40 the forward transition surface 86 forms a radius larger than a forward tooth root radius formed by the forward tooth root 82. In the case of second half link 42 rearward transition surface 92 forms a radius larger than a rearward tooth root radius formed by the rearward tooth root 84. It can also be seen from FIG. 5 that rearward transition surface 90 forms a half tooth surface, and from FIG. 8 that forward transition surface 88 forms a half tooth surface.

It will be recalled that first clamping surface 50 and second clamping surface 66 are formed complementary to one another. Accordingly, description and discussion herein of features of one of clamping surface 50 or 66 can be understood by way of analogy to refer to the other except where otherwise indicated or apparent from the context. First tooth set 52 and second tooth set 68 are thus substantially mirror images of one another in one embodiment, as are ascending slopes 54 and 70 and descending slopes 58 and 72, respectively. FIG. 5 illustrates additional features of first tooth set 52 that will be understood to refer by way of analogy to features of tooth set 68. It will be recalled that rearward transition surface 90 extends from the rearward tooth root 82 to descending slope 58. Rearward transition surface 90 may form a half tooth as noted above, including a tooth surface oriented at a tooth angle 94 relative to a horizontal plane that is the same as analogously defined tooth angles of each of the teeth in tooth set 52. Tooth angle 94 may be approximately 55°. Each of teeth 78 also defines a tooth radius 91. Tooth radius 91 may be from 1.98 millimeters to 4 millimeters. Each of teeth 78 may be fore-to-aft symmetrical, and together define a tooth-to-tooth distance 96. The tooth-to-tooth distance or tooth distance may be from 13 millimeters to 18 millimeters. The forward tooth root 82 forms a lead-in root radius, shown with reference numeral 93 in FIG. 5. Lead-in root radius 93 is larger than the radius formed by the other tooth roots 82, and may be blended with transition surface 86, which is in turn blended with ascending slope 54. The rearward tooth root 84 of second half link 42 forms an analogous lead-in radius. "Blended" means smoothly transitioning such that an endpoint of a line segment, in profile, defined by the forward tooth root 82 is also an endpoint of a line segment, in profile, formed by transition surface 86, which in turn transitions to an endpoint of a line segment formed by ascending slope 54. Lead-in root radius 93 may be from 4.8 millimeters to 6 millimeters, as may a lead-in root radius in second tooth set 68. Quantities given herein, dimensioned or dimensionless, can be understood to encompass deviations from the listed quantities within measurement error.

As noted above, certain proportional and dimensional attributes of master link 36 cooperate to enable fitting of two or three full teeth within a spatial envelope between forward bolt hole 74 and rearward bolt hole 76. One of these proportional attributes is a ratio of bolt hole distance 101 to link pitch distance 100. Bolt hole distance 101 is a distance in a fore and aft direction between center axes of bolt holes 74 and 76. Link pitch distance 100 is a distance in a fore and aft direction between center axes of first transverse bore 49 and second transverse bore 64. The ratio of bolt hole distance 101 to link pitch distance 100 may be from 0.22:1 to 0.33:1. In an implementation, bolt hole distance 101 is from 44 millimeters to 91 millimeters, and link pitch distance 100 is from 203 millimeters to 318 millimeters. It will also be recalled that first bore-to-bolt distance 98 is defined by first transverse bore 49 and forward bolt hole 74. Second bore-to-bolt distance 99 is defined by second transverse bore 64 and rearward bolt hole 76. First bore-to-bolt distance 98 extends between center axes of the respective bores in a fore and aft direction. Second bore-to-bolt distance 99 extends in a fore and aft direction between center axes of the respective bores. Ratios of first bore-to-bolt distance 98 to bolt hole distance 101, and second bore-to-bolt distance 99 to bolt hole distance 101, may be from 0.5:1 to 1:1. It will also be recalled that first transverse bore 49 may include a pin bore, and second transverse bore 64 may include a bushing bore. In such an embodiment, the ratio of first bore-to-bolt distance 98 to bolt hole distance 101 is from 0.57:1 to 1:1. Also in such an embodiment the ratio of second bore-to-bolt distance 99 to bolt hole distance 101 is from 0.55:1 to 0.86:1.

As also discussed above, first half link 40 and second half link 42 define forward face width 104, and rearward face width 106. Since first half link 40 and second half link 42 are complementary and mate together, face width 104 and face width 106 could be found on either of first half link 40 or second half link 42, but are labeled on only one of first half link 40 and second half link 42 for convenience. Each of forward face width 104 and rearward face width 106 is a widest, or nearly widest, part of the respective half link outside of an enlarged center section where the respective tooth sets are formed. Ratios of forward face width 104 to full width 102, and rearward face width 106 to full width 102, may be from 0.4:1 to 0.8:1. In a refinement, and where first transverse bore 49 includes a pin bore and second transverse bore 64 includes a bushing bore as discussed above, the ratio of forward face width 104 to full width 102 is from 0.57:1 to 0.75:1. Also in such an embodiment the ratio of rearward face width 106 to full width 102 may be from 0.4:1 to 0.63:1. The different-sized, and locally enlarged face widths 104 and 106 relative to full width 102 can assist in supporting bolts 44 and dissipating stresses through a relatively larger volume of material around bolt holes 74 and 76 than would otherwise be available. Enlarged widths of the respective half links where face widths 104 and 106 exist will typically be limited in longitudinal or fore and aft extent. Thus, in a practical implementation each of first half link 40 and 42 may bulge outwardly to accommodate the placement of extra link material. Moreover, bolt holes 74 and 76 may be offset relative to one another more laterally than might otherwise be practicable. As shown in FIG. 6 forward face width 104 may be measured, widthwise, at a fore and aft location where an inside curved surface profile 105 of first half link 40 transitions to a linear surface profile 111. Second face width 106 may be measured, widthwise, at a location where a curved inside surface profile 107 transitions to a linear surface profile 113.

INDUSTRIAL APPLICABILITY

It will be recalled that bolt holes in master link 36 are located relative to the respective tooth sets such that there is no overlap between the bolt holes and the forwardmost and rearwardmost tooth roots. In other words, bolt holes are located, and the two or three full teeth are shaped and sized, such that a distribution of the tooth sets is confined to the space between the bolt holes. Bolt holes, and including the material surrounding and defining the bolt holes, can be subject to stress concentrations during service. Likewise, stress concentrations can arise at the relatively tightly curved tooth root radiuses in a set of teeth. The present disclosure reflects the discovery and observation that overlapping of features having a tendency to produce stress concentrations can lead to an increased risk of performance degradation, such as cracking or failure in a master link. Whereas certain earlier master link designs employed overlapping bolt holes and tooth roots, in the present disclosure these features have been spaced from one another to avoid superposition of the stress concentration locations. As a result, reduced risk of fracture is expected according to the present disclosure.

The present disclosure also reflects discovery and observations relating to limitations of single-tooth designs in master links, and master links having more than three teeth. In the case of certain single-tooth master links, providing only a single interlocking tooth and recess on each of two half links can result in challenges to obtaining interlocking of the half links, potentially resulting in rotation or rocking during service that can ultimately lead to performance degradation or failure. In the case of a number of teeth greater than three it can be expected that the teeth cannot be fit into a space between bolt holes, in at least certain track links, without compromising on other factors such as tooth size or shape including tooth-to-tooth distance, tooth angle, tooth radius, lead-in root radius, manufacturability, and potentially other factors. The dimensional and proportional attributes of master link 36 thus reflect balancing of such factors, where teeth in an optimal size range and shape range, and tooth number, can be implemented in the space between bolt holes.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having." or the like are intended to be open-ended terms. Further, the phrase "based on" is intended to mean "based, at least in part, on" unless explicitly stated otherwise.

What is claimed is:

1. A master link for a ground-engaging track comprising:
a first half link including a first link strap having a first transverse bore formed therein, and a first clamping surface forming a first tooth set, an ascending slope extending between the first tooth set and a shoe side of the first half link, and a descending slope extending between the first tooth set and a rail side of the first half link;
a second half link including a second link strap having a second transverse bore formed therein, and a second clamping surface forming a second tooth set, an ascending slope extending between the second tooth set and a shoe side of the second half link, and a descending slope extending between the second tooth set and a rail side of the second half link;
a forward bolt hole and a rearward bolt hole are each formed in part within each of the first half link and the second half link and intersect each of the first clamping surface and the second clamping surface, and are structured to receive a forward bolt and a rearward bolt, respectively, for clamping the first half link and the second half link together to interlock the first tooth set and the second tooth set;
the first tooth set and the second tooth set each include a plurality of teeth alternating with a plurality of tooth roots including a forward tooth root adjacent to the respective ascending slope, and a rearward tooth root adjacent to the respective descending slope; and
the first tooth set and the second tooth set are confined in distribution between the forward bolt hole and the rearward bolt hole.

2. The master link of claim 1 wherein:
the forward bolt hole and the rearward bolt hole define a bolt hole distance, and the first half link and the second half link together define a link pitch distance; and
a ratio of the bolt hole distance to the link pitch distance is from 0.22:1 to 0.33:1.

3. The master link of claim 2 wherein:
the bolt hole distance is from 44 millimeters to 91 millimeters; and
the link pitch distance is from 203 millimeters to 318 millimeters.

4. The master link of claim 2 wherein:
the first transverse bore and the forward bolt hole define a first bore-to-bolt distance, and the second transverse bore and the rearward bolt hole define a second bore-to-bolt distance;
ratios of the first bore-to-bolt distance to the bolt hole distance, and the second bore-to-bolt distance to the bolt hole distance, are from 0.5:1 to 1:1;
the first half link and the second half link define a forward face width, and a rearward face width, and each of the first set of teeth and the second set of teeth defines a tooth width; and
ratios of the forward face width to the tooth width, and the rearward face width to the tooth width, are from 0.4:1 to 0.8:1.

5. The master link of claim 4 wherein:
the first transverse bore includes a pin bore, and the second transverse bore includes a bushing bore;
the ratio of the first bore-to-bolt distance to the bolt hole distance is from 0.57:1 to 1:1;
the ratio of the second bore-to-bolt distance to the bolt hole distance is from 0.55:1 to 0.86:1;
the ratio of the forward face width to the tooth width is from 0.57:1 to 0.75:1; and
the ratio of the rearward face width to the tooth width is from 0.4:1 to 0.63:1.

6. The master link of claim 2 wherein the plurality of teeth includes a total of 2 full teeth in the first tooth set and the second tooth set.

7. The master link of claim 6 wherein the plurality of teeth define a tooth distance from 13 millimeters to 18 millimeters, and a tooth radius from 1.98 millimeters to 4 millimeters.

8. The master link of claim 7 wherein the plurality of tooth roots in each of the first tooth set and the second tooth set each include a lead-in root radius from 4.8 millimeters to 6 millimeters.

9. A ground-engaging track comprising:
a track chain having a plurality of track links coupled end-to-end and including a plurality of standard links and a master link;
the master link including a first half link, and a second half link;
the first half link includes a first link strap, and a first clamping surface forming a first tooth set;
the second half link includes a second link strap, and a second clamping surface forming a second tooth set;
a forward bolt hole and a rearward bolt hole are each formed in part within each of the first half link and the second half link and intersect each of the first clamping surface and the second clamping surface, and are structured to receive a forward bolt and a rearward bolt, respectively, to clamp the first half link and the second half link together such that the first tooth set and the second tooth set are interlocked; and
the first tooth set and the second tooth set each include a plurality of teeth alternating with a plurality of tooth roots, and are confined in distribution between the forward bolt hole and the rearward bolt hole.

10. The ground-engaging track of claim 9 wherein the plurality of teeth includes a total of two or three full teeth in each of the first tooth set and the second tooth set.

11. The ground-engaging track of claim 10 wherein the plurality of teeth includes a total of two full teeth in each of the first tooth set and the second tooth set.

12. The ground-engaging track of claim 10 wherein each of the first tooth set and the second tooth set includes a forward tooth root, and a forward transition surface extending from the forward tooth root, and a rearward tooth root and a rearward transition surface extending from the rearward tooth root.

13. The ground-engaging track of claim 12 wherein the forward bolt hole intersects one of the forward transition surfaces but not the other of the forward transition surfaces, and the rearward bolt hole intersects one of the rearward transition surfaces but not the other of the rearward transition surfaces.

14. The ground-engaging track of claim 10 wherein each of the first clamping surface and the second clamping surface includes an ascending slope extending between the respective first tooth set or second tooth set and a shoe side of the master link, and a descending slope, oriented transversely to the respective ascending slope, and extending between the respective first tooth set or second tooth set and a rail side of the master link.

15. The ground-engaging track of claim 9 wherein:
the forward bolt hole and the rearward bolt hole define a bolt hole distance, and the first half link and the second link half link together define a link pitch distance; and
a ratio of the bolt hole distance to the link pitch distance is from 0.22:1 to 0.33:1.

16. The ground-engaging track of claim 15 wherein:
the first link strap includes a first transverse bore, and the second link strap includes a second transverse bore;
the first transverse bore and the forward bolt hole define a first bore-to-bolt distance, and the second transverse bore and the rearward bolt hole define a second bore-to-bolt distance; and
ratios of the first bore-to-bolt distance to the bolt hole distance, and the second bore-to-bolt distance to the bolt hole distance, are from 0.5:1 to 1:1.

17. The ground-engaging track of claim 9 wherein:
the first half link and second half link define a forward face width, and a rearward face width, and each of the first set of teeth and the second set of teeth defines a tooth width; and
ratios of the forward face width to the tooth width, and the rearward face width, to the tooth width, are from 0.4:1 to 0.8:1.

18. A master link for a ground-engaging track comprising:
a first half link including a first link strap having a first transverse bore formed therein, and a first clamping surface forming a first tooth set, an ascending slope extending between the first tooth set and a shoe side of the first half link, and a descending slope extending between the first tooth set and a rail side of the first half link;
a second half link including a second link strap having a second transverse bore formed therein, and a second clamping surface forming a second tooth set, an ascending slope extending between the second tooth set and a shoe side of the second half link, and a descending slope extending between the second tooth set and a rail side of the second half link;
a forward bolt hole and a rearward bolt hole are each formed in part within each of the first half link and the second half link to receive bolts for clamping the first half link and the second half link together;
the first tooth set and the second tooth set each include a total of two full teeth and a total of three tooth roots; and
the forward bolt hole and the rearward bolt hole each intersect the first clamping surface and the second clamping surface and are located outside of the first tooth set and the second tooth set, such that bolt hole stress concentration locations are spaced fore and aft, respectively, of tooth root stress concentration locations in the master link.

19. The master link of claim 18 wherein:
each of the first half link and the second half link includes a forward tooth root and a forward transition surface extending from the forward tooth root to the respective ascending slope, and a rearward tooth root and a rearward transition surface extending from the rearward tooth root to the respective descending slope; and
the forward bolt hole intersects one of the forward transition surfaces but not the other of the forward transition surfaces, and the rearward bolt hole intersects one of the rearward transition surfaces but not the other of the rearward transition surfaces.

20. The master link of claim 18 wherein:
the forward bolt hole and the rearward bolt hole define a bolt hole distance, and the first half link and the second half link together define a link pitch distance;
a ratio of the bolt hole distance to the link pitch distance is from 0.22:1 to 0.33:1;
the first transverse bore and the forward bolt hole define a first bore-to-bolt distance, and the second transverse bore and the rearward bolt hole define a second bore-to-bolt distance;
ratios of the first bore-to-bolt distance to the bolt hole distance, and the second bore-to-bolt distance to the bolt hole distance, are from 0.5:1 to 1:1;
the first half link and second half link define a forward face width, and a rearward face width, and each of the first set of teeth and the second set of teeth defines a tooth width; and
ratios of the forward face width to the tooth width, and the rearward face width to the tooth width, are from 0.4:1 to 0.8:1.

* * * * *